No. 879,644. PATENTED FEB. 18, 1908.
W. J. JEFFRIES & E. G. SKEELS.
SWIVEL.
APPLICATION FILED MAR. 26, 1907.
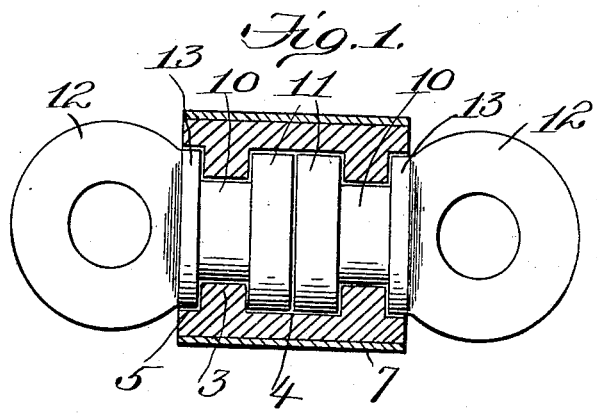
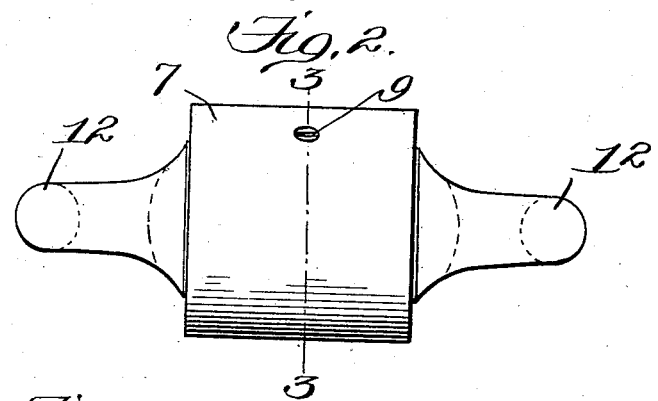
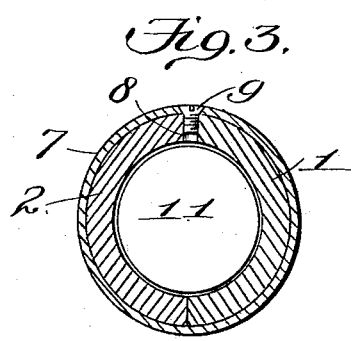
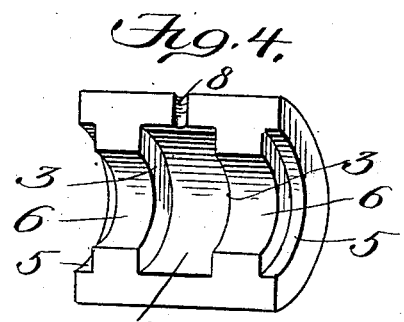
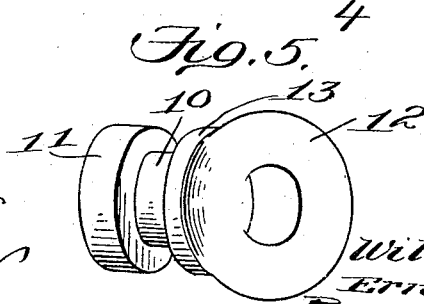
Witnesses
Inventors
William J. Jeffries
Ernest G. Skeels
By James L. Norris
Atty

UNITED STATES PATENT OFFICE.

WILLIAM J. JEFFRIES AND ERNEST G. SKEELS, OF KALAMA, WASHINGTON.

SWIVEL.

No. 879,644.  Specification of Letters Patent.  Patented Feb. 18, 1908.

Application filed March 26, 1907. Serial No. 364,640.

*To all whom it may concern:*

Be it known that we, WILLIAM J. JEFFRIES and ERNEST G. SKEELS, citizens of the United States, residing at Kalama, in the county of Cowlitz and State of Washington, have invented new and useful Improvements in Swivels, of which the following is a specification.

This invention relates to swivels of that type having connecting means at opposite extremities and adapted for use with blocks or introduction in lengths of chains, cables or the like at points where it may be found desirable to establish a swivel connection.

One of the objects of the invention is to provide a strong and durable swivel having members reinforced by auxiliary devices to resist bending, and particularly equipped with a shank structure which obstructs breaking or distortion of the swivel at points where considerable strain is usually imposed.

The present improved swivel will be preserved in its normal condition under ordinary usage, and its operation thereby prolonged by reason of the fact that it will resist the injurious effects of lateral or side strain, as well as longitudinal strain, and at the same time prevent ingress into the interior of the casing or bushing therefor of grit or mud when dragged over the ground surface.

The invention consists in the construction and arrangement of the several parts which will be hereinafter more fully specified.

In the drawings, Figure 1 is a longitudinal vertical section of a swivel embodying the features of the invention. Fig. 2 is a side elevation of the same. Fig. 3 is a transverse vertical section on the line 3—3, Fig. 2. Fig. 4 is a detail perspective view of one of the casing members or sections. Fig. 5 is a detail perspective view of one of the swivel members.

Similar characters of reference are employed to indicate corresponding parts in the several views.

The swivel casing is composed of two members 1 and 2 of any desired exterior form, either semi-circular, half-square or half-rectangle, or polygonal, and duplicate in construction, each section being provided with internal semi-circular ribs 3, separated a suitable distance to form a central groove or seat 4. The ribs are located inwardly a distance from the opposite ends of each section to provide semi-circular recesses 5, the ribs, grooves and recesses of the two members or sections 1 and 2 when united forming a continuous internal circular construction, the ribs themselves having their adjacent faces recessed or formed with semi-circular concavities, as at 6, to receive the shank or swivel members which will be presently described. The members or sections 1 and 2 are secured to each other by a sleeve 7 which is slipped there over, and extending through the two sections and the sleeve is a screw opening 8 which forms oiling means for the interior of the casing and is normally closed by a screw 9. This screw 9 also assists in holding the sleeve in place, but the primary purpose of the said screw is to close the opening 8.

The improved swivel is of duplicate form and includes two swivel members, each of which has a shank 10, with a head 11 on its inner end, an eye 12 on its outer end, and an integral collar 13 at the base of the eye to fit the recess 5 formed at each end of the casing. The heads of the two swivel members occupy the central groove of the casing, and when the said members are fully in place within the casing the two shanks with their heads and collars are free to rotate or to conform to twisting movements or rotations of the chains, cables or other devices attached to the eyes 12.

It will be observed that the collars 13 reinforce the shanks 10 at points where great strength is required, and said collars brace the shanks and prevent bending or breaking of the same, and also close or occlude the openings at opposite ends of the casing and prevent the passage of dirt or grit into the interior of the complete device. By thus obstructing entrance of dirt or grit into the casing the wearing qualities of the improved swivel are materially prolonged and the device as an entirety is rendered more durable. By the location of the collars 13 at the points specified, bending or breaking of the shanks 10 will be prevented and the strength of the swivel materially increased and its usefulness enhanced. Another point of advantage in the improved swivel construction is that it may be disposed in varying positions with respect to the block around which it may be pulled without liability of fracture or distortion. In oiling the swivel it is only necessary to remove the screw 9, the parts of the device remaining intact during the oiling operation.

Changes in the proportions, dimensions and minor details may be resorted to without departing from the spirit of the invention.

Having thus fully described the invention, what is claimed, is:

In a device of the class described, the combination of a casing, and a swivel member movably mounted in the casing and having a shank with a head at its inner end, an engaging device on the outer extremity, and a collar at the base of the engaging device which is fitted and movable in the end of the casing.

In testimony whereof we have hereunto set our hands in presence of two subscribing witnesses.

WILLIAM J. JEFFRIES.
ERNEST G. SKEELS.

Witnesses:
WM. DEADRICK,
J. D. MONTGOMERY.